United States Patent [19]

Reed

[11] 4,321,908
[45] Mar. 30, 1982

[54] PREVENTION OF FREEZE DAMAGE TO LIQUID CONDUITS

[76] Inventor: Robert S. Reed, 1204 Sunland Rd., Daytona Beach, Fla. 32019

[21] Appl. No.: 150,297

[22] Filed: May 16, 1980

[51] Int. Cl.³ .................................................. F24J 3/02
[52] U.S. Cl. ..................................... 126/420; 137/59; 138/28; 237/80
[58] Field of Search ............. E03B/7/10; 138/27, 28, 138/32; 137/59; 126/420, 417, 442; 237/80; 165/134

[56] References Cited

U.S. PATENT DOCUMENTS

| | | | |
|---|---|---|---|
| 157,190 | 11/1874 | Calantarients | 137/59 |
| 386,098 | 7/1888 | Whitner | 137/59 |
| 1,952,780 | 3/1934 | Small | 138/28 |
| 2,029,630 | 2/1936 | McMichael | 138/28 |
| 2,409,304 | 10/1946 | Morrison | 165/134 |
| 2,599,325 | 6/1952 | Fritzberg | 138/28 |
| 3,407,837 | 10/1968 | Fulton et al. | 138/28 |
| 3,480,027 | 11/1969 | Noland | 137/59 |
| 3,878,868 | 4/1975 | Wheeler | 138/28 |
| 3,989,032 | 11/1976 | Harrison | 137/59 |
| 4,227,512 | 10/1980 | Riley | 137/59 |

FOREIGN PATENT DOCUMENTS 2410228 7/1979 France .............................. 126/420

Primary Examiner—Daniel J. O'Connor
Attorney, Agent, or Firm—Arthur G. Yeager

[57] ABSTRACT

Freeze damage to pipes containing liquids is accomplished by including in the interior of the pipe an elongated section of tubing sealed at each end and containing internally an inert gas under pressure; a means for attaching one end of the tubing to the pipe to prevent linear axial movement of the tubing and a means at the other end of the tubing to maintain it concentrically within the pipe and to permit safe linear axial expansion of the tubing.

27 Claims, 3 Drawing Figures

PREVENTION OF FREEZE DAMAGE TO LIQUID CONDUITS

BACKGROUND OF THE INVENTION

It is well known that when water freezes to solid ice it undergoes an expansion in volume of about 9% and this physical change has been the cause of many instances of bursting of water pipes. There have been many solutions to this problem. In residential homes where freezing temperatures occur at some time during the year it has been normal to make sure that all water piping is insulated or otherwise kept from being subjected to freezing temperatures by putting such pipes under ground or inside houses which are heated to prevent freezing temperatures from occurring. In instances where insulation is not practical the freezing temperature of the water could be changed by introducing the antifreeze solution into the water, the pipes could be jacketed with heating coils or other means to keep the temperature of the water above freezing.

Still other means have been attempted in the past to prevent freeze damage to pipes containing water or other liquids which will freeze. In U.S. Pat. No. 2,409,304 to Morrison there is a disclosed central compressible core which is placed inside a pipe containing water and which provides an internal expansion volume to accomodate the volume needed when the water freezes.

This means is satisfactory in a general sense, but in order to accomodate water piping in a practical way it leaves much to be desired. The turns, couplings and other fittings in modern piping do not lend themselves to having a continuous length of compressible core as shown in this prior art. Furthermore the liquid pressure is such that compressible cores might be so compressed that little safety volume would remain for that needed when the water freezes. Still further, the compressible core may tend to move away from its required position due to the velocity changes of the flowing water in the pipe.

It is an object of this invention to provide an improved means for preventing freeze damage to liquid conduits by employing the concept of a central compressible core in a new way.

BRIEF DESCRIPTION OF THE INVENTION

This invention provides an apparatus to prevent freeze damage to a pipe conducting a pressurized liquid which comprises an elongated linear section of tubing sealed at each end and containing internally an inert gas under pressure in excess of the pressure of said liquid; a means for attaching the first end of said tubing to said pipe so as to prevent linear axial movement of said first end of tubing with respect to said pipe and to maintain said first end concentrically within said pipe; and a means at the second end of said tubing to maintain said second end concentrically within said pipe and to permit safe, limited, linear axial expansion of said tubing with respect to said pipe. In one embodiment of this invention the inert gas is argon or nitrogen under a pressure of 80-100 psi. In another embodiment of this invention the tubing is nylon and the volume of inert gas in the tubing at room temperature and at a pressure of 80-100 psi is about 20-30% of the volume of the liquid in the pipes.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
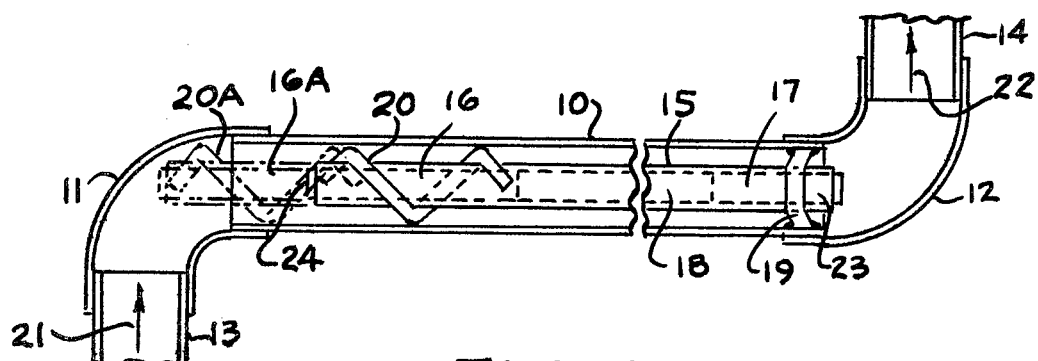
FIG. 1 is a cross-sectional view of piping containing the means of this invention for preventing freeze damage to the pipe.

With reference to FIG. 1 there is shown a section of piping with the apparatus of this invention installed therein. Straight section of piping 10 is joined at each end to elbows 11 and 12, which in turn, are joined to straight sections of pipe 13 and 14, respectively. Generally along the axis of pipe 10 there is placed a section of resilient tubing 15 sealed at each end, e.g. with solid plugs 16 and 17. The interior hollow portion 18 of tubing 15 is filled with an inert gas under pressure. Tubing 15 may be any resilient material such as rubber, plastic, nylon, etc. Because of its durability and other desirable properties nylon is the preferred material for tubing 15 and also for plugs 16 and 17. It is not critical how plugs 16 and 17 are affixed to tubing 15 so long as the result is a permanent gas-tight seal. This may be accomplished by suitable adhesives, spin-welding, etc.

The inert gas which is used to fill the internal hollow space 18 of tubing 15 may be any gas which does not react with the tubing under the conditions of use or otherwise cause adverse effects. Argon and nitrogen are preferred gases for this purpose. Oxygen and air are not preferred because under pressure and at the temperatures involved the oxygen becomes active and eventually causes deterioration of rubber, nylon, and other plastics which might be used for tubing 15. The gas in tubing 15 is maintained under a pressure of 80-100 psi at normal room temperature conditions (about 75° F.). With such a pressure the tubing is effective to provide the necessary compressibility and volume to accomodate the formation of ice at 32° F. and 65 psi, and it also is capable of existing under the higher temperature conditions (up to 300° F.) to which the piping may be occasionally subjected.

It is an important feature of this invention to maintain tubing 15 in a generally static location in pipe 10 although it must be free to expand with increasing temperatures and with the compression to which the tubing 15 is subjected when the liquid in pipe 15 solidifies. For this purpose it is necessary to fix one end of tubing 15 relative to pipe 10 and to allow the other end of tubing 15 to be free to expand linearly. A preferred means of attaching one end of tubing 15 to pipe 10 is by means of pin 19 passing through tubing 15 and plug 17 and being soldered or otherwise rigidly affixed to pipe 10. It is desirable, but not critical that the fixed end of tubing 15 be maintained generally in the center of pipe 10 to permit a flow of fluid to pipe 10 in the annulus between tubing 15 and piping 10. One method of accomplishing this centering of tubing 15 is to bend pin 19 so that the portion of the pin passing through tubing 15 and plug 17 is at an angle with respect to the portions of the pin extending from tubing 15 to pipe 10. Such an arrangement prevents tubing 15 from sliding laterally along pin 19 to one or the other of the extremities of pin 19 adjacent the wall of pipe 10.

The other end of tubing 15 must be left free to expand axially to accomodate the expansion which is needed when the liquid in tube 10 solidifies and compresses tubing 15 causing it to exapnd axially; or alternatively, to permit expansion when the temperature of the light in pipe 10 is sufficiently high to cause thermal expansion of tubing 15. A suitable means for this purpose is a short helix of wire 20 separating tubing 15 from the inside surface of pipe 10. Helix 20 will move during expansion, with tubing 15 and serve as a turbulator for the fluid in the pipe and as a guide to maintain tubing 15 in the center of pipe 10 when tubing 15 is caused to expand. Thus, in its normal position plug 16 and helix 20 will be in the position shown in solid lines, and when tubing 15 is caused to expand, these respective portions are shown in dotted lines at position 16A and 20A. The rigidity of plug 16 encircled by helix 20 provides support for tube 15 and prevents kinking or failure of tube 15 in elbow 11.

When the fluid in pipe 10 is flowing in the direction shown by arrows 21 and 22 it is preferable that tubing 15 be positioned with its fixed end 23 downstream and its expandable end 24 upstream, for improved turbulation and heat transfer characteristics.

It is of course an important factor to provide the sizes and volumes of tubing 15 to match those needed by pipe 10. While this can vary over a reasonable range, it is important to provide the correct amount of annular space to maintain adequate fluid velocity for best heat transfer in pipe 10 and to provide ample inert gas to accomodate the expansion of volume when the fluid in pipe 10 freezes. Generally it may be said that the volume of inert gas in hollow portion 18 under the pressure conditions existing under pipe 10 and at room temperature should be about 20-30% of the volume of liquid in the pipe in which the section of tubing is located. This does not necessarily means that the length of pipe 10 and the length of tubing 15 are identical. If there are short sections of piping (e.g. 13 or 14) adjacent to one end or the other of tubing 15 it may not be necessary to employ a corresponding section of tubing for each section 13 or 14 of pipe, since tubing 15 will provide some protection from freeze damage for nearby pipe because ice will flow laterally somewhat during the initial stages of freezing. Normally sections of piping more than 6 pipe diameters away from the inert gas 18 should have a separate length of expansion tubing to prevent freeze damage in that section of the pipe.

In order to illustrate relative sizes and dimensions involved in this invention the illustration of FIG. 1 can be considered to show ½ in. nominal diameter copper piping for elements 10, 11, 12, 13, and 14. Tubing 15 may be nylon 5/16 in. O. D.×0.243 in. I.D. If the fluid in pipe 10 is water, and the length of pipe 10 is 10 ft., the overall length of tubing 15 and plugs 16 and 17 is approximately 9.8 ft. Plugs 16 and 17 may be approximately 1-1½ in. long. Helix 20 is a short length of ⅛ copper tubing of approximately 1¼-1½ turns over a length of about 1.2 inch. It should be clear that for other sizes of pipe 10 there will be appropriate and corresponding changes in the sizes of tubing 15.

Pin 19 for these sizes of pipe 10 and tubing 15 may be approximately ⅛ in. in diameter and long enough to be bent slightly and yet reach opposite sides of pipe 10 for soldering into notches in pipe 10.

Another separate, practical reason for maintaining tube 15 in the center of pipe 10 is that in the assembly of pipe 10 to fittings, such as elbows 11 and 12, pipe 10 must be heated in order to apply solder to the joints. A typical solder for such purposes is 95% tin and 5% antimony having a melting point of about 450°-465° F. Copper pipe 10 is an excellent conductor of heat and the pipe rapidly conducts sufficient heat to cause melting and deterioration of the nylon tubing 15 if it should be in contact with pipe 10. Maintaining tubing 15 on pin 19 in the center of pipe 10 minimizes any adverse effects upon the material (e.g. nylon) of tubing 15, although even in this case a small amount of melting will occur around pin 19. Similarly, maintaining the free end 16 of tubing 15 within helix 20 serves the same purpose of preventing serious damage to tubing 15 during the soldering of elbow 11 to pipe 10 and, at the same time, anchors helix 20 to tube 15 by slightly melting tube 15 around the contours of helix 20.

Figure 2:
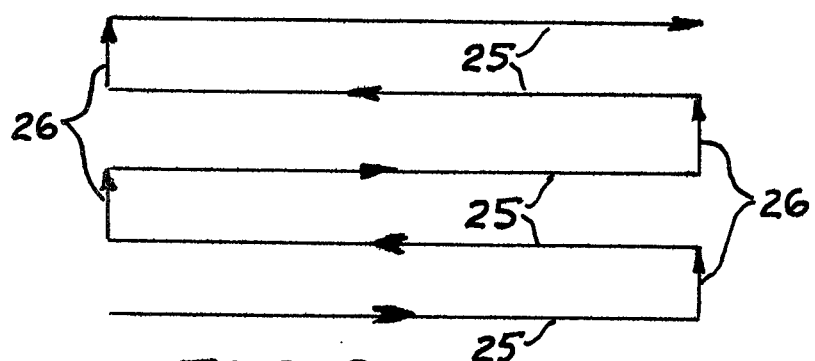
FIG. 2 is a schematic illustration of a piping arrangement in which this invention might be used.
Figure 3:
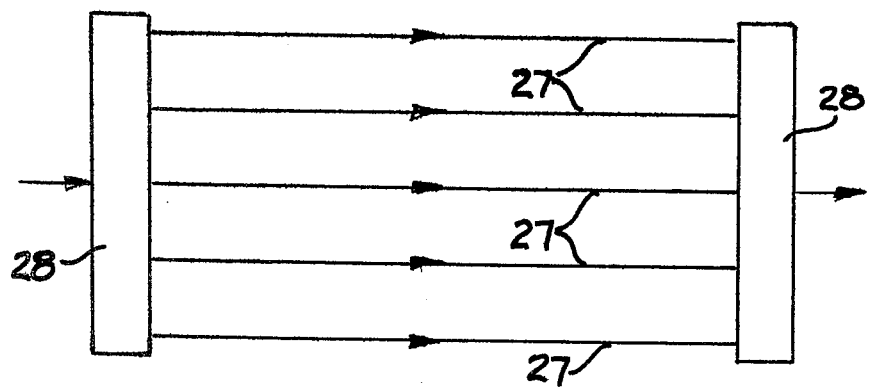
FIG. 3 is a schematic illustration of an alternative piping arrangement in which the present invention might be employed.

It is immaterial whether the apparatus of this invention is placed in conduits where the flow of liquid is in series as shown in FIG. 2, or whether the flow is in parallel as shown in FIG. 3. It is only necessary that all pipe that is exposed freezing temperatures contain the apparatus of this invention for preventing freeze damage. In FIG. 2 it would normally only be necessary to include the freeze damage prevention means in the long straight runs 25 and not in the short return bend sections 26 if the are sufficiently short in length as discussed above. With respect to FIG. 3 it will be necessary to include the freeze damage prevention means in long straight runs 27 and also in headers/28 if those headers have a substantial volume.

The apparatus of this invention finds use in many locations. In any residence or business office where water piping may be subjecting to freezing temperatures the apparatus of this invention would be desirable. In industrial applications where liquid conduits are subject to freezing temperature conditions, the apparatus of this invention can be advantageously employed. A particularly suitable application for this invention is in a solar heat collection unit where it is necessary for the efficient collection of solar heat that water piping be free of insulation so as to readily absorb the solar heat. Normally solar heat collectors have little natural protection from freezing temperatures at night or during times when solar heat is not available, and therefore must be protected from freeze damage. Such heat collectors are usually made of a series of long straight runs of piping such as that shown in FIG. 2 and the apparatus of this invention can be used advantageously to protect it from freeze damage. In such units the straight runs 25 are normally 6-12 ft. in length and this is admirably suited for the incorporation of nylon tubing to prevent freeze damage in accordance with this invention.

While the invention has been described with respect to certain specific embodiments, it will be appreciated that many modifications and changes may be made to those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus to prevent freeze damage to a pipe conducting a pressurized liquid which comprises an elongated linear section of linearly expansible and contractible, and collapsible tubing sealed by solid plugs at each end and containing internally a gas under a pressure in excess of the highest pressure of said liquid; means for attaching one said plugged end of said tubing to said pipe so as to prevent linear axial movement of said one end of tubing with respect to said pipe and to maintain said one end concentrically within said pipe; and means at the other plugged end of said tubing to maintain said other end concentrically within said pipe to permit limited linear axial expansion of said tubing with respect to said pipe.

2. The apparatus of claim 1 wherein said liquid is water.

3. The apparatus of claim 1 wherein said gas is inert and is argon or nitrogen.

4. The apparatus of claim 1 wherein said gas is under a pressure of 80–100 psi at normal room temperature.

5. The apparatus of claim 1 wherein said tubing is nylon.

6. The apparatus of claim 1 wherein the volume of said gas at the pressure existing in said tube when said liquid is at room temperature is about 20–30% of the volume of said liquid in said pipe.

7. The apparatus of claim 1 wherein said means for attaching said one plugged end of said tubing to said pipe is an elongated pin passing laterally through said tubing and plug and fixed at each pin end to said pipe.

8. The apparatus of claim 1 wherein said means to maintain said other plugged end of said tubing concentrically within said pipe is a turbulating coil of wire around the outside of said other plugged end extending over a length of said other plugged end equivalent to about 3–6 diameters of the outside diameter of said tubing.

9. The apparatus of claim 8 wherein said coil comprises 1–2 turns is positioned about said one plugged end with said solid plug therewithin throughout said turns.

10. The apparatus of claim 1 wherein said solid plugs have a length of about 3–6 diameters of the outside diameters of said tubing.

11. The apparatus of claim 1 wherein said means for attaching includes a pair of opposed and laterally extending legs engaged with said plug of said one end of said tubing and fixed at the outer ends of said legs to said pipe.

12. A solar heat collector having pipes containing a pressurized liquid for absorbing solar heat, a plurality of elongated sections of tubing having opposite end portions, a pair of solid plugs respectively sealing said end portions, said tubing containing internally a gas under a pressure in excess of the pressure of said liquid and respectively positioned in each linear length of said pipe longer than about 6 pipe diameters, means for attaching one said end portion to said pipe so as to prevent linear axial movement of said one end portion with respect to said pipe and to maintain said one end portion concentrically within said pipe, and means at the other end portion to maintain said other end portion concentrically within said pipe to permit linear nonbending expansion of said tubing with respect to said pipe.

13. The collector of claim 12 wherein said gas is inert and is argon or nitrogen.

14. The collector of claim 13 wherein said gas is at a pressure of 80–100 psi at normal room temperature 15. The collector of claim 12 wherein said tubing is nylon.

16. The collector of claim 12 wherein the total volume of gas at the pressure existing in said tubing at about 75° F. is about 20–30% of the total volume of liquid in the piping of said collector.

17. The collector of claim 12 wherein said means for attaching includes a pair of opposed and laterally extending legs in contact with said plug in said one portion and fixed at the outer ends thereof to said pipe.

18. The collector of claim 17 wherein said legs are unitary and form a pin passing laterally through said tubing end portion and said solid plug therein.

19. The collector of claim 12 wherein said means to maintain said other end portion includes a turbulating coil of wire around the outside of said other end portion extending over and in contact with said tubing only about the length of said plug therein.

20. The collector of claim 19 wherein said tubulating coil length is equivalent to about 3–6 diameters of the outside diameter of said tubing.

21. The collector of claim 19 wherein said turbulating coil has 1–2 turns and permits sliding movement between said coil and said pipe due to linear expansion and contraction of said tubing.

22. An apparatus to prevent freeze damage to a pipe containing a pressurized liquid which comprises an elongated hollow resilient tube having opposite end portions with the ends sealed and containing internally within said hollow a gas under a pressure in excess of the pressure of said liquid; a solid plug sealing each said end portion of said tube, means for attaching one said end portion to said pipe for preventing linear axial movement of said one end portion with respect to said pipe and for maintaining said one end portion generally concentrically within said pipe; and means in contact with the other of said end portions of said tube for maintaining said other end portion concentrically within said pipe for permitting limited linear axial expansion of said tube with respect to said pipe when said liquid freezes therewithin whereby said tube flattens and linearly axially expands toward said other end portion.

23. The apparatus of claim 22 wherein said means for maintaining said second tube comprises a turbulating coil of wire surrounding the outside surface of said tube over said solid plug thereat, said coil of wire being a spiral and occupying the space between said pipe and said tube.

24. The apparatus of claim 23 wherein said liquid is water.

25. The apparatus of claim 24 wherein said gas is inert.

26. The apparatus of claim 22 wherein said means for attaching said first end of said tube to said pipe comprises an elongated pin having a central portion passing laterally through said tube and said solid plug in said one end portion and having lateral portions extending outwardly of said tube and affixed to said pipe.

27. The apparatus of claim 26 wherein said means for attaching includes a pair of opposed and laterally extending legs in contact with said plug in said one end portion of said tubing and fixed at the outer ends of said legs to said pipe.

* * * * *